(12) United States Patent
Kamiyama et al.

(10) Patent No.: US 9,200,742 B2
(45) Date of Patent: Dec. 1, 2015

(54) LATERAL PIPE-LINING METHOD

(75) Inventors: Takao Kamiyama, Hiratsuka (JP); Koji Kaneta, Hiratsuka (JP); Kenji Fujii, Hiratsuka (JP); Fuminori Tanaka, Hiratsuka (JP)

(73) Assignee: SHONAN GOSEI-JUSHI SEISAKUSHO K.K. (JP)

(*) Notice: Subject to any disclaimer, the term of this patent is extended or adjusted under 35 U.S.C. 154(b) by 162 days.

(21) Appl. No.: 12/798,797

(22) Filed: Apr. 12, 2010

(65) Prior Publication Data

US 2010/0258244 A1    Oct. 14, 2010

(30) Foreign Application Priority Data

Apr. 13, 2009   (JP) .................................. 2009-096912
Jun. 4, 2009    (JP) .................................. 2009-134580

(51) Int. Cl.
*F16L 55/179*    (2006.01)
*B29C 65/00*     (2006.01)
(Continued)

(52) U.S. Cl.
CPC ............... *F16L 55/179* (2013.01); *B29C 63/00* (2013.01); *B29C 65/00* (2013.01); *F16L 55/1651* (2013.01); *B29C 63/0017* (2013.01); *B29C 63/0021* (2013.01); *B29C 63/0047* (2013.01); *B29C 63/0056* (2013.01); *B29C 63/0065* (2013.01); *B29C 63/0069* (2013.01); *B29C 63/0073* (2013.01); *B29C 63/0091* (2013.01); *B29C 63/04* (2013.01); *B29C 63/06* (2013.01); *B29C 63/08* (2013.01); *B29C 63/10* (2013.01); *B29C 63/16* (2013.01); *B29C 63/18* (2013.01); *B29C 63/182* (2013.01); *B29C 63/20* (2013.01); *B29C 63/22* (2013.01); *B29C 63/26* (2013.01);
(Continued)

(58) Field of Classification Search
CPC  B29C 63/00; B29C 63/0017; B29C 63/0021; B29C 63/0047; B29C 63/0056; B29C 63/0065; B29C 63/0069; B29C 63/0073; B29C 63/0091; B29C 63/04; B29C 63/06; B29C 63/08; B29C 63/10; B29C 63/16; B29C 63/18; B29C 63/182; B29C 63/26; B29C 63/28; B29C 63/30; B29C 63/32; B29C 63/34; B29C 63/341; B29C 65/00; B29C 65/02; B29C 65/26; B29C 65/48; B29C 65/481; B29C 63/20; B29C 63/22
USPC .......... 156/285–287, 382; 264/511, 526, 553, 264/566, 568, 571; 425/388, 405.1, 405.2, 425/504
See application file for complete search history.

(56) References Cited

U.S. PATENT DOCUMENTS 3,351,509 A * 11/1967 Alberghini et al. ........... 156/195
3,996,967 A * 12/1976 Takada ........................... 138/97
(Continued)

*Primary Examiner* — Michael N Orlando
*Assistant Examiner* — Matthew Hoover
(74) *Attorney, Agent, or Firm* — Adams & Wilks

(57) ABSTRACT

A lateral pipe-lining method for lining a lateral pipe that intersects a main pipe. A lateral pipe-lining material has a tubular resin-absorbing material impregnated with a curable resin and has a flange formed at one end thereof. The flange is disposed on an expandable flange-pressing implement. The expandable flange-pressing implement is expanded using a heat medium that is supplied by a first fluid source and that heats the flange of the lateral pipe-lining material to bring the flange into contact with a periphery of a lateral pipe opening of the main pipe. The lateral pipe-lining material is inserted into the lateral pipe using a fluid from a second fluid source different from the first fluid source, and the curable resin impregnated in the tubular resin-absorbing material is cured to line the lateral pipe.

25 Claims, 14 Drawing Sheets

(51) Int. Cl.
*F16L 55/165* (2006.01)
*B29C 63/00* (2006.01)
*B29C 63/04* (2006.01)
*B29C 63/10* (2006.01)
*B29C 63/08* (2006.01)
*B29C 63/06* (2006.01)
*B29C 63/16* (2006.01)
*B29C 63/22* (2006.01)
*B29C 63/26* (2006.01)
*B29C 63/18* (2006.01)
*B29C 63/28* (2006.01)
*B29C 63/20* (2006.01)
*B29C 63/34* (2006.01)
*B29C 63/30* (2006.01)
*B29C 65/48* (2006.01)
*B29C 65/02* (2006.01)
*B29C 63/32* (2006.01)
*B29C 65/26* (2006.01)

(52) U.S. Cl.
CPC ............... *B29C 63/28* (2013.01); *B29C 63/30* (2013.01); *B29C 63/32* (2013.01); *B29C 63/34* (2013.01); *B29C 63/341* (2013.01); *B29C 65/02* (2013.01); *B29C 65/26* (2013.01); *B29C 65/48* (2013.01); *B29C 65/481* (2013.01)

(56) References Cited

U.S. PATENT DOCUMENTS 5,329,063 A * 7/1994 Endoh .................... 138/98
5,566,719 A * 10/1996 Kamiyama et al. ........... 138/98
5,971,032 A * 10/1999 Ward ..................... 138/98
6,001,212 A * 12/1999 Polivka et al. ............ 156/287

* cited by examiner

LATERAL PIPE-LINING METHOD

BACKGROUND OF THE INVENTION

1. Field of the Invention

The present invention relates to a lateral pipe-lining method for lining a lateral pipe using a lateral pipe-lining material impregnated with a curable resin having a flange formed at one end thereof, and a flange-pressing implement for a lateral pipe-lining material used in the lateral pipe-lining method.

2. Description of the Related Art

Known in the art are pipe-lining methods for lining the internal peripheral surface of aging sewer pipes or other pipes buried underground so that they can be repaired without having to be dug from the ground.

These methods employ a pipe-lining material having a flexible tubular resin-absorbing material impregnated with a curable resin that is covered with a highly airtight film on the exterior thereof. The pipe-lining material is everted and inserted into the pipe using hydrostatic pressure. The pipe-lining material is heated while being pressed against the internal peripheral surface of the pipe by the hydrostatic pressure, and the resin impregnated in the pipe-lining material is cured, thereby lining the internal peripheral surface of the pipe.

Such a method can be applied to a lateral pipe that branches from a main pipe, as described in Japanese Laid-open Patent Application Nos. 1992-355115 and 2008-168468. When a lateral pipe is to be lined, a lateral-pipe lining material with a flange formed at one end thereof is prepared and housed in a pressure bag. The flange of the lateral pipe-lining material is positioned on a head collar of a work robot introduced inside the main pipe and is brought into close contact with the lateral pipe opening in the main pipe by driving the work robot. Compressed air is fed inside the pressure bag to evert and insert the lateral pipe-lining material into the lateral pipe. When the pipe-lining material is everted and inserted throughout the entire length of the lateral pipe, the lateral pipe-lining material is kept pressed against the internal peripheral surface of the lateral pipe and heated to cure the impregnated thermosetting resin. The internal peripheral surface of the lateral pipe is lined by the lateral pipe-lining material thus cured.

The flange of the lateral pipe-lining material is usually impregnated with a thermosetting resin and previously cured when it is manufactured in the factory. Alternatively, the flange of the lateral pipe-lining material is made of a thermoplastic resin. In either case, the flange of the lateral pipe-lining material lacks flexibility at room temperature. Therefore, an adequately close contact with the periphery of the lateral pipe opening of the main pipe cannot be achieved when there is a manufacturing error in the flange or when there are concavities and convexities in the periphery of the lateral pipe opening of the main pipe.

In these cases, gaps are disadvantageously produced between the flange of the lateral pipe-lining material and the periphery of the lateral pipe opening of the main pipe when lining is complete. Underground water as well as earth and sand from the ground flow into the main pipe via the gap, and the drainage performance of the main pipe is degraded.

SUMMARY OF THE INVENTION

An object of the present invention is to provide a lateral pipe-lining method for lining a lateral pipe that is capable of bringing the flange of a lateral pipe-lining material into adequately close contact with the periphery of the lateral pipe opening of the main pipe to line the lateral pipe with high quality; and to provide a flange-pressing implement for a lateral pipe-lining material that is used in the lateral pipe-lining method.

According to the present invention there is provided a lateral pipe-lining method for lining a lateral pipe that intersects a main pipe, the method comprising:

preparing a lateral pipe-lining material having a tubular resin-absorbing material impregnated with a curable resin and having a flange formed at one end thereof;

disposing the flange of the lateral pipe-lining material on an expandable flange-pressing implement;

pressing the flange of the lateral pipe-lining material against the periphery of a lateral pipe opening of the main pipe via the flange-pressing implement; and inserting the lateral pipe-lining material into the lateral pipe and curing the curable resin impregnated in the tubular resin-absorbing material to line the lateral pipe.

The present invention is also characterized by a flange-pressing implement used in the lateral pipe-lining method. The flange-pressing implement comprises an inner bag having a hose mounted thereon; and a bag-shaped cover for covering the inner bag. A fluid is fed into the inner bag via the hose to expand the inner bag and press the flange of the lateral pipe-lining material against the periphery of the lateral pipe opening of the main pipe.

The present invention is also characterized by a flange-pressing implement used in the lateral pipe-lining method. The flange-pressing implement comprises a tube mounted in a spiral shape and having a hose attached to one end thereof. A fluid is fed into the tube via the hose to expand the tube in a circular or elliptical shape and press the flange of the lateral pipe-lining material against the periphery of the lateral pipe opening of the main pipe.

In accordance with the present invention, the flange of the lateral pipe-lining material makes adequately close contact with the periphery of the lateral pipe opening of the main pipe, and therefore, a gap is not produced therebetween. Accordingly, neither underground water nor earth or sand from the ground flows into the main pipe via the gap between the flange of the lateral pipe-lining material and the periphery of the lateral pipe opening of the main pipe. Therefore, the drainage performance of the main pipe can be improved.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the attached drawings.

Figure 1:
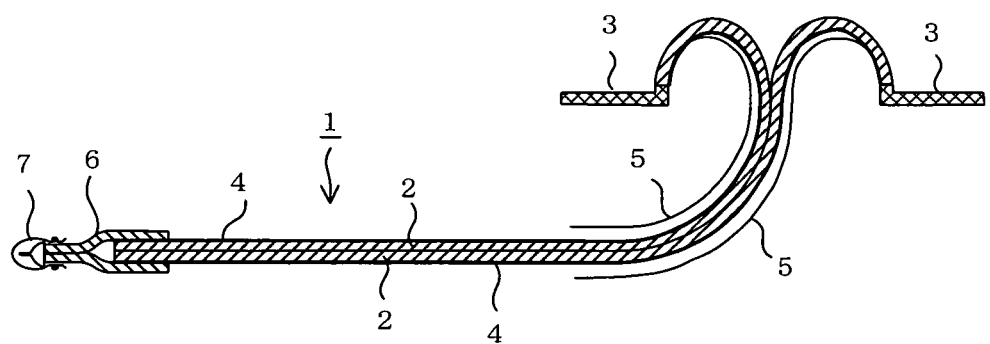
FIG. 1 is a cross-sectional view of a lateral pipe-lining material used in the method of the present invention.

FIG. 1 shows a lateral pipe-lining material 1 for lining a lateral pipe that intersects a main pipe. The lateral pipe-lining material 1 has a soft tubular resin-absorbing material 2, and one end thereof is outwardly folded back to constitute a brim-shaped flange 3. The portion that does not include the flange 3 of the tubular resin-absorbing material 2 is impregnated with an uncured liquid thermosetting resin, and is coated on the external surface thereof with a highly airtight plastic film 4 composed of polyethylene, polypropylene, nylon, vinyl chloride, or the like (the external surface becoming the internal peripheral surface when everted).

The tubular resin-absorbing material 2 is composed of a matte, woven, or non-woven material made of polyamide, polyester, polypropylene, or another plastic fiber; a matte or woven material made of glass fiber; or a matte, woven, or non-woven material having a combination of the plastic fiber and fiber glass. The thermosetting resin impregnated in the tubular resin-absorbing material 2 is, e.g., an unsaturated polyester resin, vinyl ester resin, or epoxy resin.

The flange 3 formed at one end of the tubular resin-absorbing material 2 has a curved surface whose curvature is substantially equal to that of a later-described main pipe 30 (see FIG. 8). The outside diameter of the flange 3 is set to be greater than the inside diameter of a lateral pipe 31 (see FIG. 8). The flange 3 is impregnated with a thermosetting resin, which is previously cured in the factory so as to provide a rigid flange whose curvature fits to that of the main pipe.

The flange 3 may be composed of a vinyl chloride or other thermoplastic resin rather than a thermosetting resin. In this case, the flange 3 and the tubular resin-absorbing material 2 are joined together using an adhesive or the like.

A peeling tube 5 of predetermined length is passed over the exterior of the tubular resin-absorbing material 2, and one end of the peeling tube 5 is removably attached to the external periphery in the vicinity of the flange 3 of the tubular resin-absorbing material 2. The other end of the peeling tube 5 is open and mounted in an airtight manner to a pressure bag (described later). The same material used for the plastic film 4 may be used for the peeling tube 5.

A tubular peeling end 6 is removably mounted on the other end of the tubular resin-absorbing material 2. The peeling end 6 is composed of the same material as the plastic film 4 and one end is closed off by a connector 7.

Figure 3A:
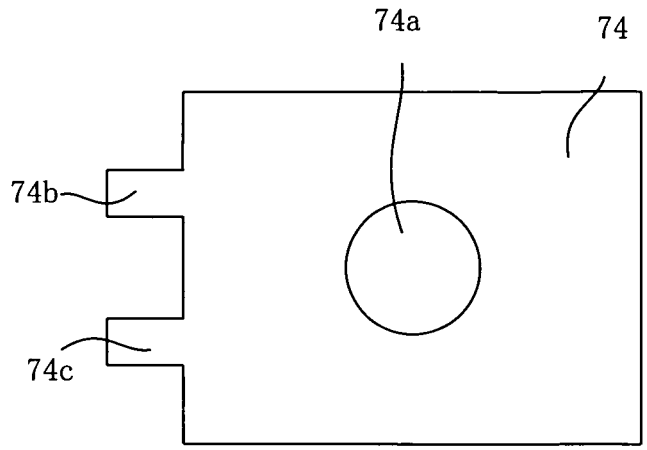
FIG. 3a is a top view showing a reinforcement cover for covering the inner bag of the flange-pressing implement.
Figure 3B:
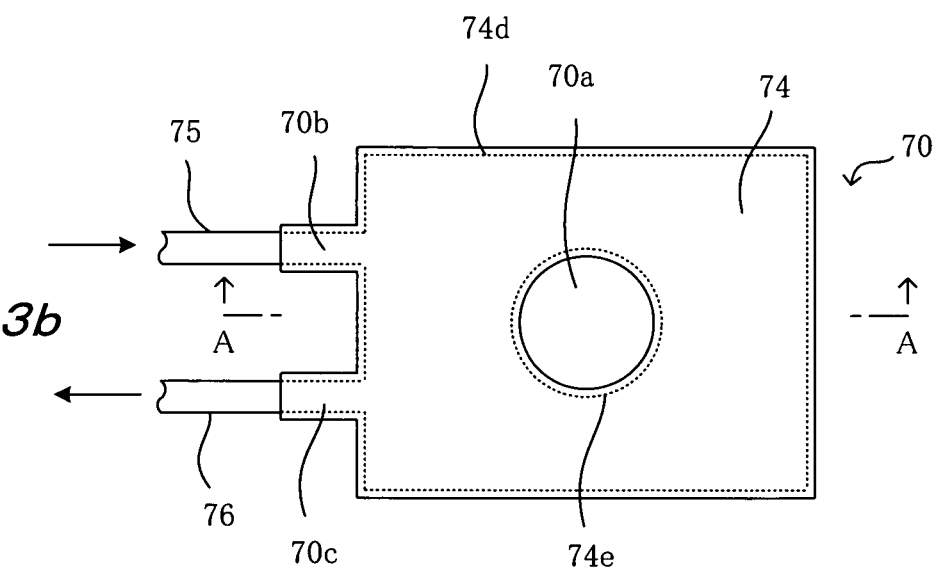
FIG. 3b is a top view of the flange-pressing implement.
Figure 3C:
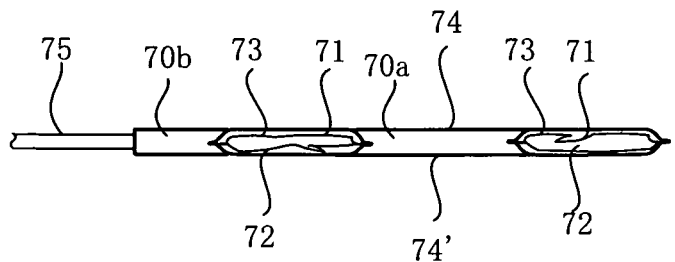
FIG. 3c is a cross-sectional view along the line A-A of FIG. 3b.

In the present embodiment, as shown in FIGS. 3a to 3c, a flange-pressing implement 70 having an inner bag 73 that is covered with a reinforcement cover 74 is used to bring the flange 3 of the lateral pipe-lining material 1 into close contact with the periphery of the lateral pipe opening of the main pipe.

Figure 2:
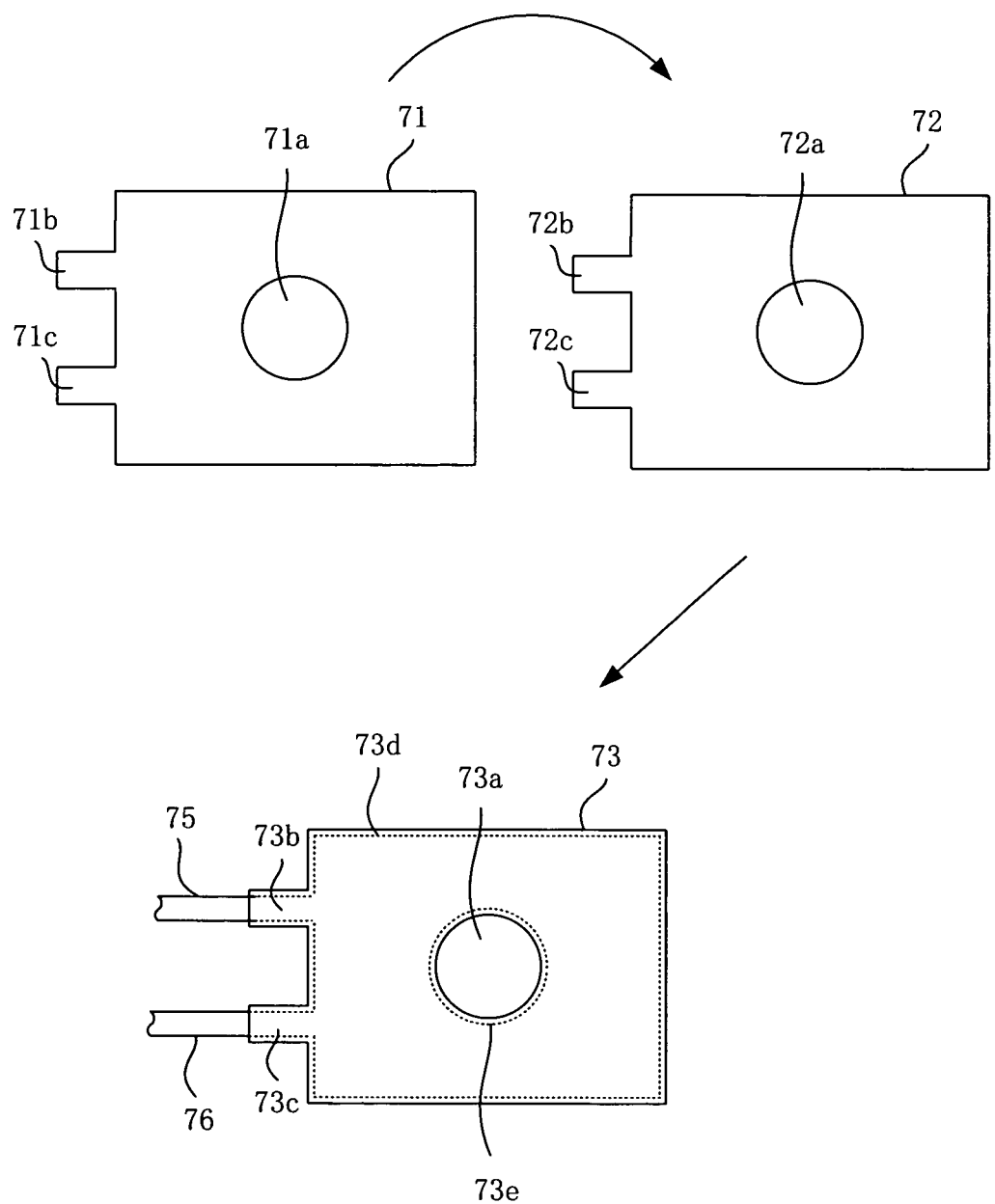
FIG. 2 is a schematic illustrative view showing a process for fabricating an inner bag of a flange-pressing implement.

The inner bag 73 is fabricated as shown in FIG. 2. A sheet 71 having a circular opening portion 71a in the center and protruding portions 71b, 71c in a side portion is placed over a sheet 72 similarly having a circular opening portion 72a in the center and protruding portions 72b, 72c in a side portion so as to form a bag shape. As shown by a dotted line in the lower portion of FIG. 2, a peripheral portion 73d and the external peripheral portion 73e of the opening portions 71a, 72a are respectively bonded airtightly. The sheets 71, 72 are made of polyethylene, polypropylene, nylon, vinyl chloride, or another highly airtight plastic.

The inner bag 73 thus fabricated has an opening portion 73a that corresponds to the opening portions 71a, 72a of the sheets 71, 72. The opening portion 73a of the inner bag 73 has a size that allows the cylindrical portion of a later-described head collar to pass. The distal ends of the protruding portions 71b, 72b of the sheets 71, 72 are not bonded and are therefore used as an intake port 73b for taking in a later-described heat medium. The distal ends of the protruding portions 71c, 72c are not bonded and are therefore used as a drainage port 73c for discharging the heat medium inside the inner bag 73. A heat medium feed hose 75 and a heat medium drainage hose 76 are mounted in an airtight manner on the heat medium intake port 73b and drainage port 73c of the inner bag 73.

As shown in FIG. 3a, the inner bag 73 is covered with a reinforcement cover 74 made of cashmere, silk, nylon, rayon, or another fiber; or silicon, polyethylene, polyurethane, or another material that does not easily stretch. The reinforcement cover 74 has an opening 74a that corresponds to the opening portions 71a, 72a of the sheets 71, 72; and protruding portions 74b, 74c that correspond to the protruding portions 71b, 71c, 72b, 72c. The reinforcement cover 74 has a shape similar to that of the sheets 71, 72, but the overall size is slightly smaller than the sheets 71, 72. A reinforcement cover 74' (FIG. 3c) similar to the reinforcement cover 74 is provided, and the entire inner bag 73 is covered by the two reinforcement covers 74, 74' so as to be housed therein. After the inner bag 73 has been covered, a periphery 74d of the reinforcement cover 74, an external peripheral portion 74e of the opening portion 74a thereof, and the corresponding portions of the reinforcement cover 74' are sewn or bonded together to provide a bag-shaped flange-pressing implement 70.

The reinforcement covers 74, 74' have a shape that is slightly smaller than that of the sheets 71, 72 of the inner bag 73. Therefore, the sheets 71, 72 in the inner bag 73 are housed in a wrinkled state, as shown in FIG. 3c. FIG. 3c is a cross-sectional view along the line A-A of FIG. 3b, which is not an accurate cross-sectional view, but rather schematically shows the inner bag 73 to be housed in a wrinkled state.

The thus configured flange-pressing implement 70 has an opening portion 70a in the center portion into which the cylindrical portion of the head collar can be inserted, and protruding portions 70b, 70c on which the heat medium feed hose 75 and the heat medium drainage hose 76 are mounted, as shown in FIG. 3b. When a fluid (liquid, air) is fed from the heat medium feed hose 75, the inner bag 73 expands overall in the form of a flat bag and generates a pressing force. At this point, the inner bag 73 is pressed against the reinforcement covers and does not completely expand, thereby preventing breakage or the application of an excessive load to the inner bag.

The external shape of the flange-pressing implement 70 is not limited to being rectangular, as shown in the drawings, and may also be circular or triangular.

Figure 4:
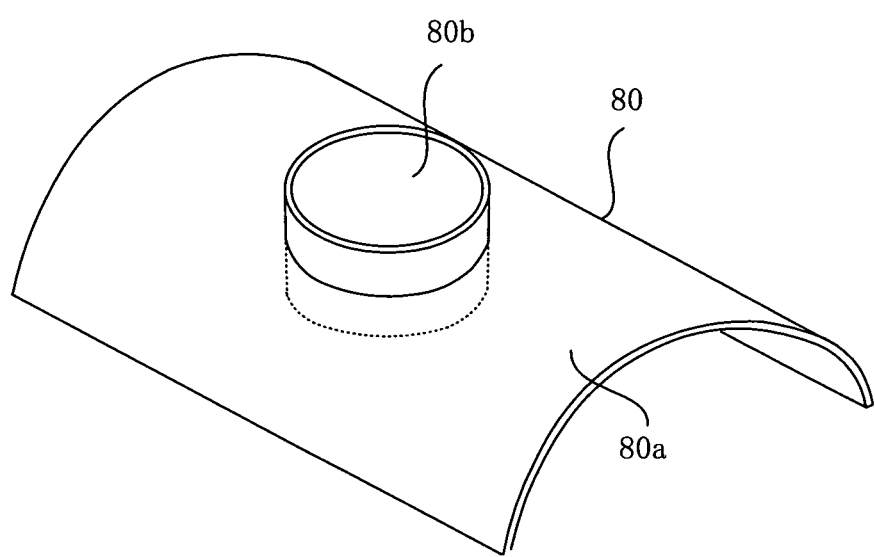
FIG. 4 is a perspective view of a head collar mounted on the work robot.

FIG. 4 shows a metal head collar (pressing jig) 80 that is mounted on a work robot (described later) and a pressure bag to position the lateral pipe-lining material on the lateral pipe. The head collar 80 has a curved portion 80a having a curvature that corresponds to the curvature of the internal peripheral surface of the main pipe. A hollow cylindrical portion 80b of the head collar 80 passes through the curved portion 80a and extends downward. The outside diameter of the cylindrical portion 80b of the head collar 80 is slightly less than the diameter of the opening portion 70a of the flange-pressing implement 70 so that the cylindrical portion 80b of the head collar 80 can pass through the opening portion 70a of the flange-pressing implement 70.

Figure 5A:
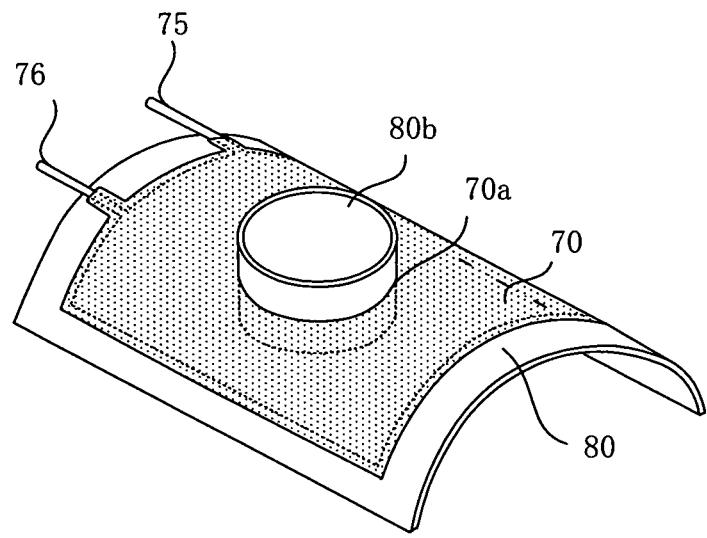
FIG. 5a is a perspective view showing the head collar on which the flange-pressing implement has been mounted.

The cylindrical portion 80b of the head collar 80 is passed through the opening portion 70a of the flange-pressing implement 70 so that the flange-pressing implement 70 may be mounted on the head collar 80, as shown in FIG. 5a. The flange-pressing implement 70 is not particularly required to be secured, but may be detachably mounted on the head collar 80 using adhesive tape in the case that there is a possibility that the flange-pressing implement 70 will move.

Figure 5B:
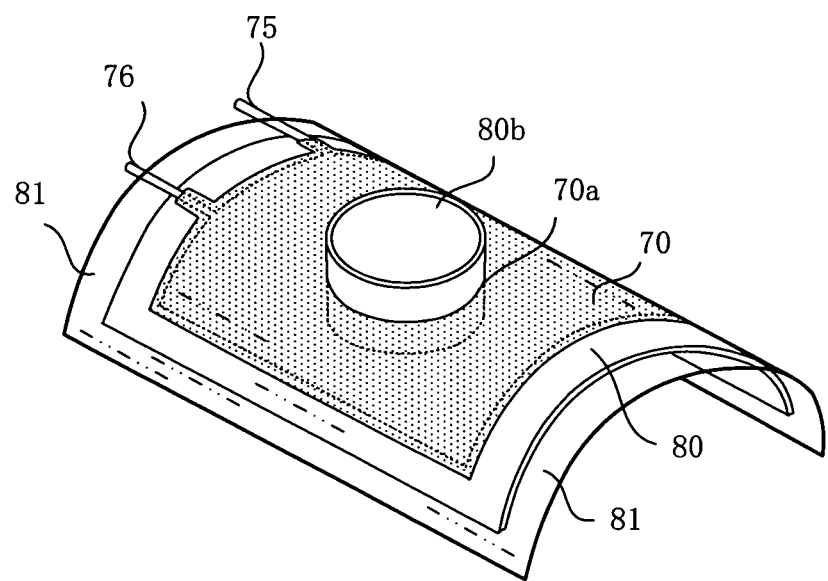
FIG. 5b is a perspective view showing the head collar on which a protective cover has been mounted.

As described below, an adhesive is applied to the flange of the lateral pipe-lining material. In order to prevent the adhesive from flowing onto the flange-pressing implement 70 or the head collar 80, the flange-pressing implement 70 and the head collar 80 are covered by a protective film 81 that is larger than the head collar 80, as shown in FIG. 5b. The protective film 81 has a central opening portion that has substantially the same diameter as the opening portion 70a of the flange-pressing implement 70. Therefore, the cylindrical portion 80b of the head collar 80 is passed through the opening portion of the protective film 81, and the protective film 81 can be placed on the flange-pressing implement 70 and the head collar 80. The protective film 81 is secured to the curved portion of the head collar 80 using an adhesive or the like so that the protective film 81 does not move.

Figure 6A:
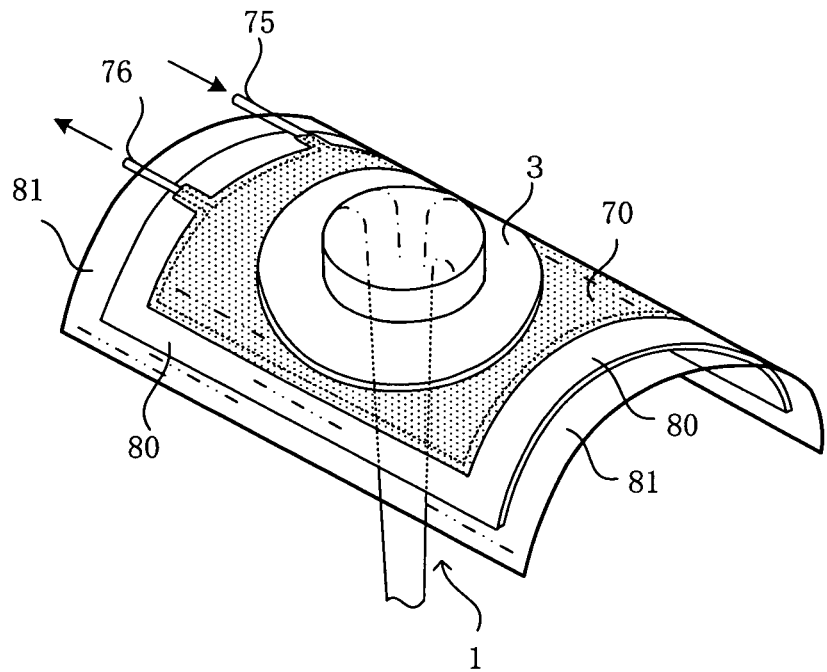
FIG. 6a is a perspective view showing the head collar on which the lateral pipe-lining material has been positioned.

Next, the lateral pipe-lining material 1 shown in FIG. 1 is inserted from the portion (the portion on which the connector 7 is mounted) of the tubular resin-absorbing material 2 into the cylindrical portion 80b of the head collar 80, and the flange 3 thereof is placed on the protective film 81 so as to cover the cylindrical portion 80b thereof, as shown in FIG. 6a. The outside diameter of the cylindrical portion 80b of the head collar 80 is made less than the inside diameter of the flange 3 so as to allow the cylindrical portion 80b of the head collar 80 to pass through the flange 3 of the lateral pipe-lining material 1 and the flange 3 to lie on the head collar 80.

Figure 6B:
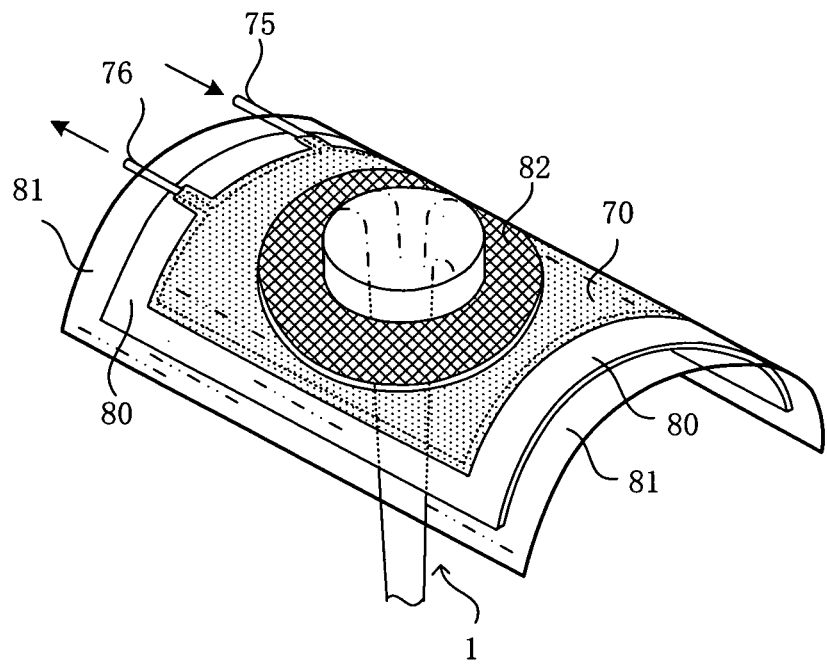
FIG. 6b is a perspective view showing an adhesive applied onto the flange of the lateral pipe-lining material.

In this manner, the lateral pipe-lining material 1 is placed on the head collar 80 via the protective film 81 and the flange-pressing implement 70. An adhesive 82 composed of unsaturated polyester resin, vinyl ester resin, epoxy resin, or the like is then coated onto the surface of the flange 3 (FIG. 6b).

Figure 8:
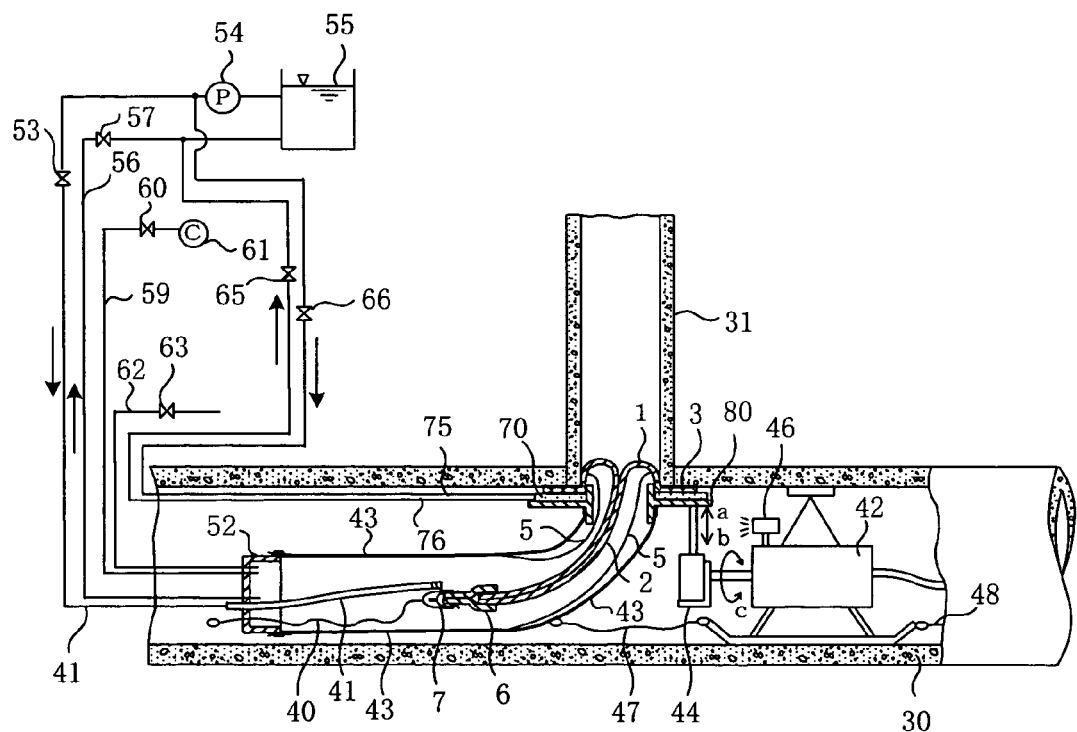
FIGS. 8 and 9 are illustrative views each showing a method for lining the lateral pipe using the lateral pipe-lining material.

The lateral pipe-lining material 1 mounted on the head collar 80 is accommodated inside a pressure bag 43, as shown in FIG. 8, and the head collar 80 is mounted in an airtight fashion at one end of the pressure bag 43.

The work robot 42 has a head 44 that reciprocates in the vertical direction a, b in FIG. 8, and is configured so as to rotate (rolling) about the pipe axis in the manner indicated by the arrow c. The head collar 80 is mounted on a head 44. A monitoring TV camera 46 is disposed on the upper part of the work robot 42. Draw ropes 47, 48 are attached to the front and rear of the work robot 42. The draw rope 47 is connected to the pressure bag 43 and the other draw rope 48 is extended to above ground. The draw rope 48 is pulled to convey the work robot 42 and the pressure bag 43 so that the flange 3 of the pipe-lining material 1 may be located in the vicinity of the lateral pipe 31 that intersects the main pipe 30.

The open end of the pressure bag 43 is closed by a cap 52, and the other end of the peeling tube 5 that is mounted on the tubular resin-absorbing material 2 of the lateral pipe-lining material 1 is mounted in an airtight manner inside the pressure bag 43.

A draw rope 40 and a hot water hose 41 that are attached to the cap 52 in an airtight manner are connected to the connector 7 on which the peeling end 6 of the lateral pipe-lining material 1 is mounted. The hot water hose 41 passes through the cap 52, extends away from the pressure bag 43, and leads to a valve 53. A hot water pump 54 feeds hot water (heat medium) to the hot water hose 41 from a hot water tank 55 that is heated by a heat source (not shown). The hot water inside the pressure bag 43 is returned to the hot water tank 55 via a drainage hose 56 and valve 57.

Hot water is also fed via the hot water pump 54 and a valve 66 from the hot water tank 55 to the heat medium feed hose 75 mounted on the flange-pressing implement 70. The hot water inside the flange-pressing implement 70 is returned to the hot water tank 55 via the heat medium drainage hose 76 and a valve 65.

An airtight space closed off by the lateral pipe-lining material 1 and the peeling tube 5 is formed inside the pressure bag 43. A compressor 61 disposed above ground is connected via an air hose 59 and valve 60 to the airtight space inside the pressure bag to feed compressed air thereto. The airtight space is also in communication with the exterior via a drainage hose 62 and valve 63 to discharge the compressed air inside the pressure bag to the exterior.

A method for lining a lateral pipe 31 using the lateral pipe-lining material 1 as described above will now be described.

The draw rope 48 is pulled to move the pressure bag 43 to the location in which the center of the cylindrical portion 80b of the head collar 80 substantially coincides with the axial center of the lateral pipe 31 (FIG. 8).

The head 44 of the work robot 42 is raised in the direction of arrow a to press the flange 3 of the lateral pipe-lining material 1 into close contact with the periphery of the lateral pipe opening of the main pipe 30 via the flange-pressing implement 70. Close contact is reduced when there is manufacturing error in the flange 3 or when there are concavities and convexities in the periphery of the lateral pipe opening. In view of such circumstances, in the present invention, the flange-pressing implement 70 is expanded to press the flange 3 against the periphery of the lateral pipe opening.

Figure 7A:
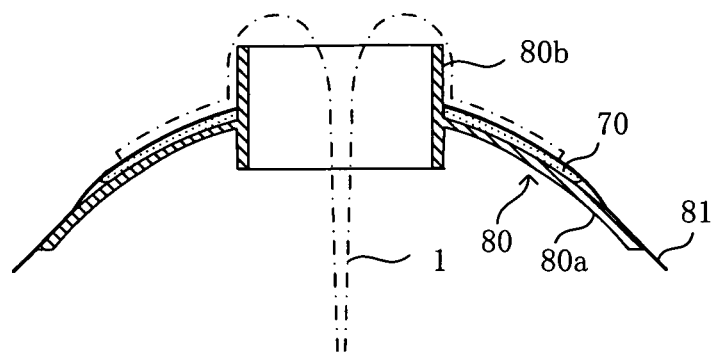
FIG. 7a is a longitudinal sectional view of the head collar before the flange-pressing implement is expanded.
Figure 7B:
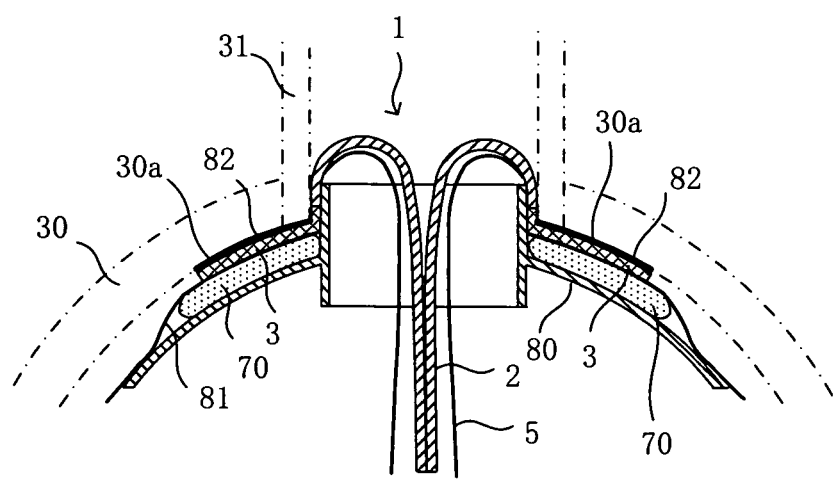
FIG. 7b is a longitudinal sectional view of the head collar at the time when the flange-pressing implement has been expanded.

Hot water is fed from the hot water tank 55 via the heat medium feed hose 75 to the inner bag 73 of the flange-pressing implement 70. The flange-pressing implement 70 is then caused to expand in the form of a flat bag as shown in FIG. 7*b*. Hot water that cannot be accommodated is returned to the hot water tank 55 via the heat medium drainage hose 76. The circulation of hot water through the flange-pressing implement 70 causes elastic pressing force to be produced therein to bring the flange 3 into close contact with the periphery 30*a* of the lateral pipe opening of the main pipe 30. FIGS. 7*a* and 7*b* are not accurate sectional views of the flange-pressing implement 70, but are schematic views for illustrating the state of expansion.

The pressing force produced by the flange-pressing implement 70 can be adjusted via the valve 66 by adjusting the feed rate of the hot water to the flange-pressing implement 70. Similarly, the pressing force produced by the flange-pressing implement 70 can also be adjusted via the valve 65 by adjusting the drainage rate of the hot water returned from the flange-pressing implement 70 to the hot water tank 55. It is also possible to adjust the pressing force of the flange-pressing implement 70 by adjusting both the feed and drainage rates of the hot water.

Hot water at a temperature of about 60° to 90° C. is fed to the flange-pressing implement 70. Therefore, the flange 3 is gradually heated, and the adhesive 82 coated thereon is cured. This allows the flange 3 to be bonded to the periphery 30*a* of the lateral pipe opening of the main pipe 30. The flange 3 is composed of a thermosetting resin and the adhesive 82 on the flange 3 is adequately heated by heat conduction by hot water even when the thermosetting resin in the flange 3 has already been cured. In the case that the flange 3 is made of a thermoplastic resin, the flange 3 is softened by heating and comes into closer contact with the periphery of the lateral pipe opening, thus allowing the flange 3 to be bonded to the main pipe 30 more reliably.

In a state in which the flange has made close contact with the periphery of the lateral pipe opening, the compressor 61 is driven to feed compressed air into the airtight space inside the pressure bag 43 via the air hose 59. This causes the lateral pipe-lining material 1 to be sequentially everted and inserted upward into the lateral pipe 31 under the pressure of the compressed air.

Figure 9:
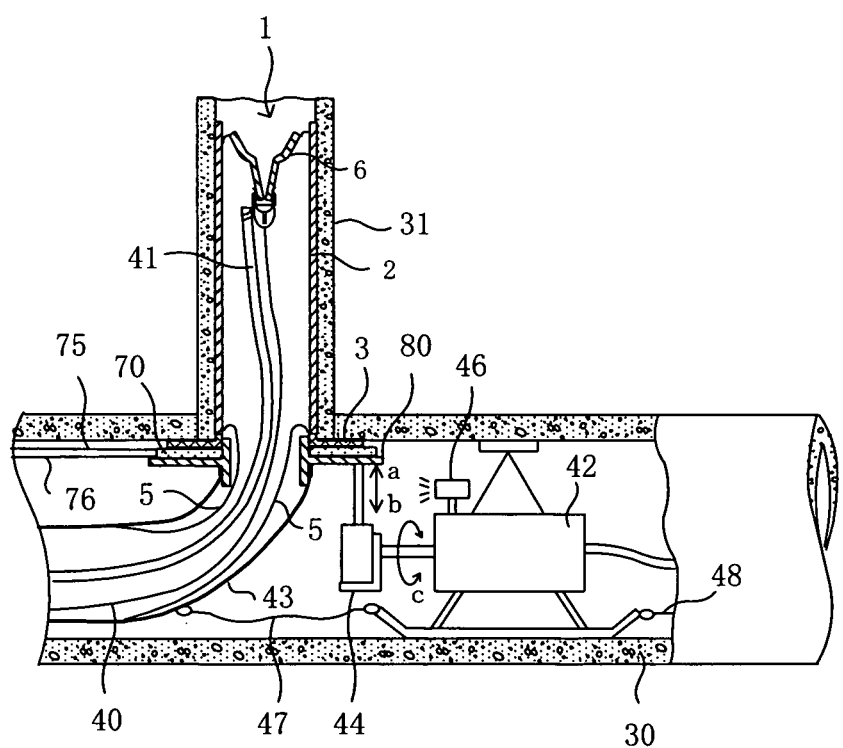

When eversion/insertion of the lateral pipe-lining material 1 into the lateral pipe 31 has ended as shown in FIG. 9, the lateral pipe-lining material 1 is kept to be pressed against the internal peripheral surface of the lateral pipe 31, and hot water is fed from the distal end of the hot water hose 41 and filled into the airtight space inside the pressure bag 43. The compressed air inside the airtight space is released into the atmosphere via the exhaust hose 62, while the thermosetting resin impregnated in the tubular resin-absorbing material 2 of the lateral pipe-lining material 1 is heated and cured by the hot water.

In the embodiment as describe above, the flange-pressing implement is expanded before the lateral pipe-lining material is inserted into the lateral pipe. However, rather than expanding the flange-pressing implement before the lateral pipe-lining material is inserted into the lateral pipe, it is also possible to expand the flange-pressing implement when the lateral pipe-lining material is inserted or being inserted into the lateral pipe, or when the curable resin impregnated in the tubular resin-absorbing material is cured after insertion has been completed, or after curing has been started.

When the resin impregnated in the tubular resin-absorbing material 2 has cured, hot water is released from the airtight space via the heat medium drainage hose 56 and returned to the hot water tank 55. The hot water inside the flange-pressing implement 70 is also returned to the hot water tank via the heat medium drainage hose 76.

When the lateral pipe-lining material 1 has cured, the head 44 of the work robot 42 is lowered in the direction of the arrow b in the drawing and the flange-pressing implement 70 is separated from the flange 3 of the lateral pipe-lining material 1. The draw rope 40 is thereafter pulled in the leftward direction in FIG. 9. At this point, the peeling tube 5, the peeling end 6, the hot water hose 41, and the like are pulled in the same direction and removed from the lateral pipe-lining material 1.

The work robot 42, the pressure bag 43, and the like are then removed from inside the main pipe 30 to finish the lining of the internal peripheral surface of the lateral pipe 31.

In place of hot water, the heat medium used for expanding the flange-pressing implement 70 and heating the adhesive 82 on the flange 3 may be hot air or a heated liquid. The heat source for obtaining hot air or the heat source for heating the liquid, and a circulation system for circulating the hot air or the heated liquid is prepared in the case that hot air or heated liquid is used as the heat medium.

Figure 10:
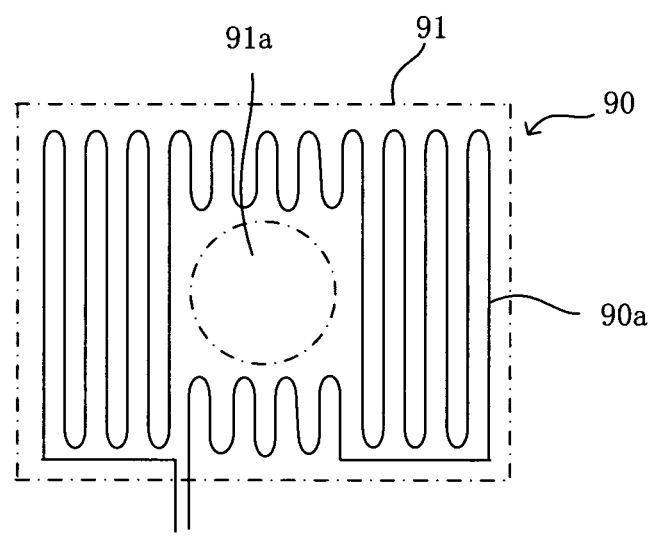
FIG. 10 is an illustrative view showing a heater arranged on the flange-pressing implement.

In the embodiment described above, the medium for heating the adhesive 82 is the same fluid for expanding the flange-pressing implement 70, but instead it is possible to use a heater 90 such as that shown in FIG. 10 to heat the adhesive 82. The heater 90 is composed of a Nichrome wire or another serpentine heater wire 90*a* that produces heat when voltage is applied. The heater 90 is overall covered by a cover 91 having waterproofness and insulative properties. The cover 91 is substantially the same size as the flange-pressing implement 70, and an opening portion 91*a* having the same size as the opening portion 70*a* of the flange-pressing implement 70 is formed in the center of the cover 91. The heater 90 is energized from above ground.

The heater 90 is disposed on the flange-pressing implement 70 protected by the protective film 81, and the cylindrical portion 80*b* of the head collar 80 is inserted through the opening portion 91*a* of the heater 90 to receive the flange 3 of the lateral pipe-lining material 1 on the heater 90. In this case, a single hose is connected to the flange-pressing implement 70 to feed compressed air from the compressor 61 because a fluid circulation system would not be required.

In FIG. 7, the heater 90 is disposed between the protective film 81 and the flange 3 of the lateral pipe-lining material 1. When the flange-pressing implement 70 is expanded using compressed air and the heater 90 is energized, the flange 3 is pressed against the periphery 30*a* of the lateral pipe opening of the main pipe 30 in the same manner as when hot water is used. Since the adhesive 82 on the flange 3 is heated and cured by the heater 90, the flange 3 can be secured to the main pipe 30 in a state of reliable close contact therewith in the same manner as when hot water is used.

Figure 11:
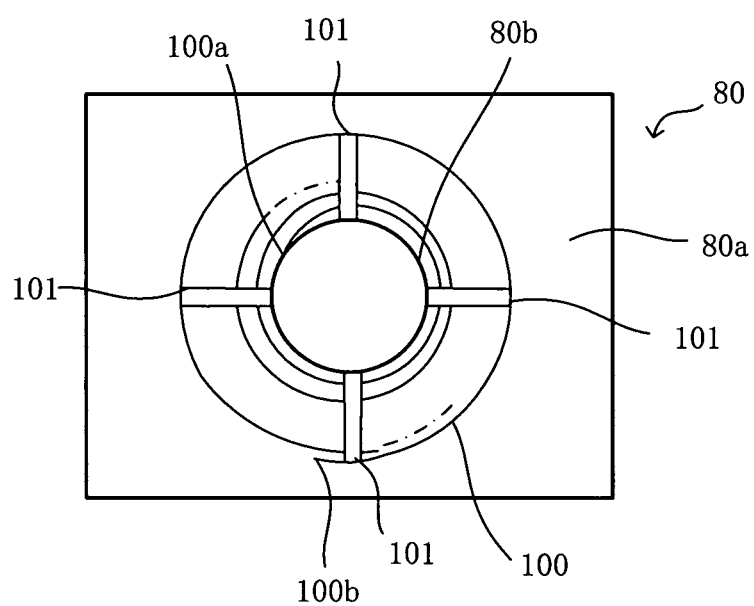
FIG. 11 is an illustrative view showing a flange-pressing implement having a tube wound around the head collar.

FIG. 11 shows another embodiment of the flange-pressing implement in which an expandable tube 100 is wound a plurality of times about the cylindrical portion 80*b* of the head collar 80. The tube 100 wound about the cylindrical portion 80*b* is bundled by elastic tapes 101 to prevent disassembly. A hose (not shown) is attached in an airtight manner to a mounting end 100*a* of the tube 100, and another hose (not shown) is also attached to the other end 100*b* of the tube 100.

The tube 100 expands in a circular or elliptical shape when hot water is fed from the hot water tank 55 via one of the hoses. The excess hot water in the tube 100 is returned to the hot water tank 55 via the other hose. An elastic pressing force is generated in the tube 100 by circulating hot water. By positioning the flange 3 of the lateral pipe-lining material 1 on the tube 100, the flange 3 can be advantageously pressed against the periphery of the lateral pipe opening of the main pipe and the adhesive on the flange 3 can be heated by the hot water in the tube 100 in the same manner as the flange-pressing implement 70. Therefore, the flange 3 can be reliably secured to the main pipe.

The pressing force produced by the tube 100 can be adjusted by adjusting the feed rate of the hot water to the tube 100 via the valve 66, by adjusting the drainage rate of the hot water to the hot water tank 55 via the valve 65, or by adjusting both the feed and drainage rates of the hot water.

In place of hot water, it is also possible to use a heated liquid, or hot air as the heat medium in the same manner as the flange-pressing implement 70.

The flange-pressing implement 70, the protective film 81, and the lateral pipe-lining material 1 may be mounted on the head collar 80 after the head collar 80 has been first positioned on the work robot. It is also possible to first mount the flange-pressing implement 70 and the protective film 81 on the head collar 80, then position the head collar 80 on the work robot, and thereafter position the lateral pipe-lining material 1 on the head collar 80.

In the embodiment described above, the head 44 of the work robot 42 lifts the head collar 80 upward from one side (the right side in FIG. 8), and the flange 3 presses against the main pipe 30. Accordingly, there is a problem in that the orientation of the work robot 42 becomes unstable due to the reaction.

Figure 12A:
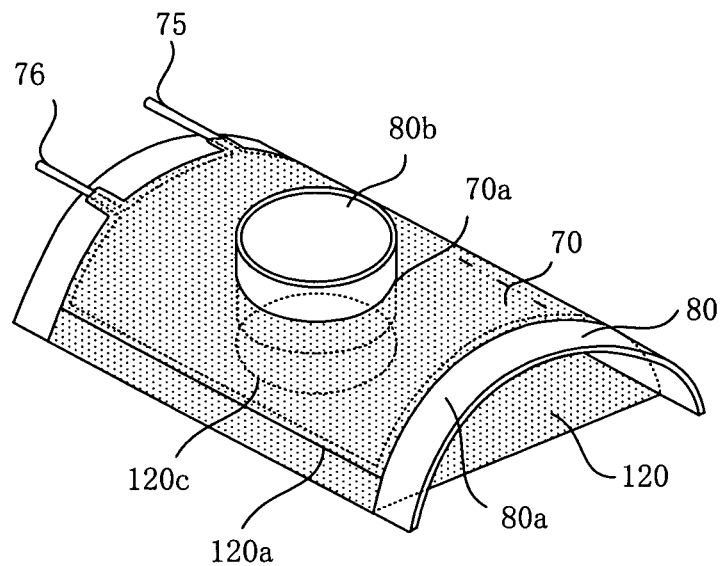
FIG. 12a is a perspective view of the head collar on which the flange-pressing implement and a cover sheet have been mounted.

In view of this situation, the lower portion of the head collar 80 is covered by a cover sheet 120, as shown in FIG. 12*a*. The pressure bag 43 is caused to expand by compressed air and makes contact with the cover sheet 120 to support the opposite side (the left side in FIG. 8) of the head collar 80.

Figure 13A:
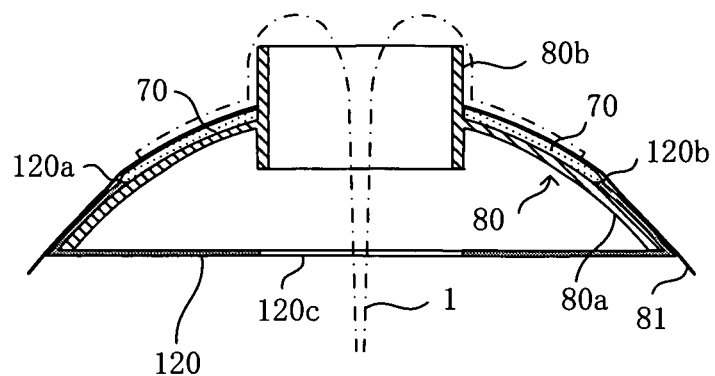
FIG. 13a is a longitudinal sectional view of the head collar to which the cover sheet and the lateral pipe-lining material have been attached.

The cover sheet 120 is a soft cover material composed of cloth or plastic, and tightly stretched over the lower portion of the curved portion 80*a* of the head collar 80. One end 120*a* and the other end 120*b* of the cover sheet 120 are folded back and secured to the flange-pressing implement 70 using an adhesive (FIG. 13*a*). The opening portion 120*c* through which the pipe-lining material 1 can pass is formed in the center portion of the cover sheet 120 in a position that corresponds to the cylindrical portion 80*b* of the head collar 80. A hole (not shown) through which the distal end of the head 44 of the work robot 42 can pass is also formed in the cover sheet 120.

Figure 12B:
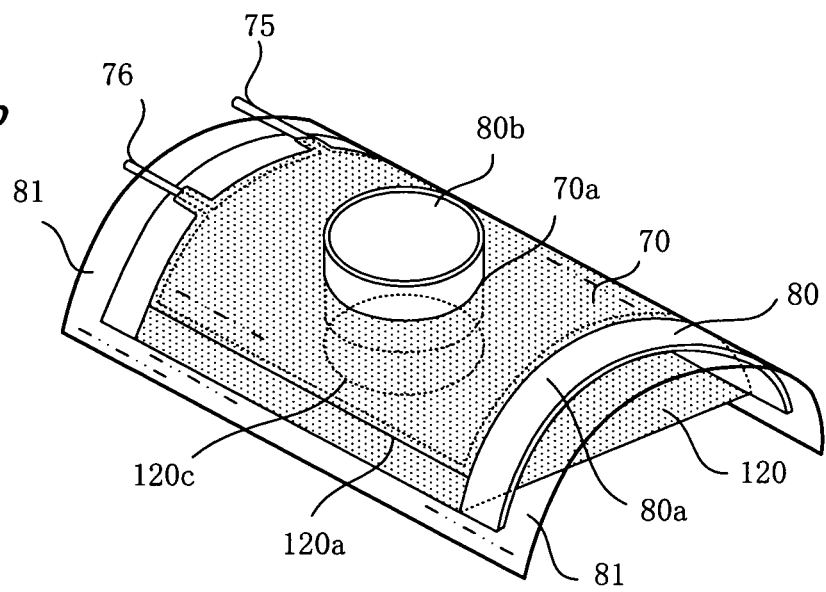
FIG. 12b is a perspective view of the head collar having a protective cover attached to the flange-pressing implement.

After the head collar 80 has been covered with the cover sheet 120, the head collar 80 is covered with the protective film 81, as shown in FIG. 12*b*. The lateral pipe-lining material 1 is thereafter positioned on the head collar 80 and the adhesive 82 is coated onto the flange 3 in the same manner as shown in FIGS. 6*a* and 6*b*.

Figure 13B:
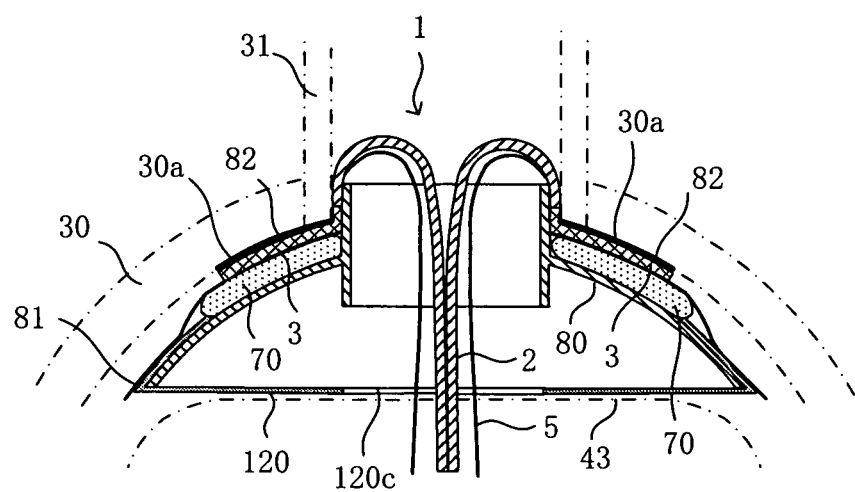
FIG. 13b is a longitudinal sectional view of the head collar together with the lateral pipe-lining material whose flange is coated with an adhesive.
Figure 14:
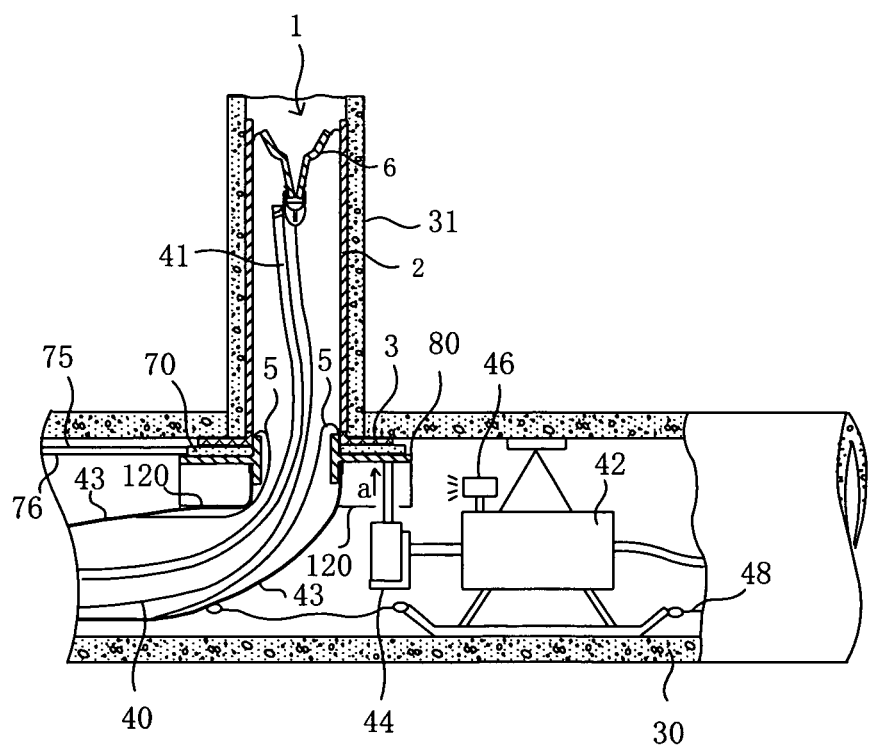
FIG. 14 is an illustrative view showing a method for lining a lateral pipe using the head collar to which the cover sheet has been attached.

The same steps are carried out as those illustrated in FIGS. 8 and 9 in the case that the lateral pipe is lined using the head collar 80 covered with the cover sheet 120. In the case that the head collar 80 is covered by the cover sheet 120, a portion of the pressure bag 43 expands by compressed air for everting the lateral pipe-lining material and makes contact with the cover sheet 120 to support the opposite side of the head collar 80 (the left side in FIG. 14), as shown in FIG. 14. This state is also shown in FIG. 13*b* by the pressure bag 43 shown by the imaginary line.

In this manner, the head collar 80 is supported on two sides by the pressure bag 43 and the head 44 of the work robot 42. It is possible to prevent the work robot 42 from being affected by a force that destabilizes the orientation of the work robot 42, and the work for lining a lateral pipe can be carried out in a smooth fashion.

The cover sheet 120 is provided across the head 44 side of the work robot 42 as well as the opposite side thereof, but there is no particular requirement that the head 44 side be covered by the cover sheet 120, and such a portion may be omitted.

What is claimed is:

1. A lateral pipe-lining method for lining a lateral pipe that intersects a main pipe, the method comprising:
   preparing a lateral pipe-lining material having a tubular resin-absorbing material impregnated with a curable resin and having a flange formed at one end thereof, an adhesive made of a thermosetting resin being applied onto the flange of the lateral pipe-lining material;
   disposing the flange of the lateral pipe-lining material on an expandable flange-pressing implement; and
   inserting the lateral pipe-lining material into the lateral pipe and curing the curable resin impregnated in the tubular resin-absorbing material to line the lateral pipe;
   wherein a heat medium is supplied to the expandable flange-pressing implement so as to expand the flange-pressing implement to press the flange of the lateral pipe-lining material into contact with the periphery of a lateral pipe opening of the main pipe, the heat medium being supplied so as to gradually heat the flange of the lateral pipe-lining material and the adhesive applied thereon, after which the adhesive is cured to thereby bond the flange to the periphery of the lateral pipe opening of the main pipe.

2. A lateral pipe-lining method according to claim 1; wherein the expandable flange-pressing implement is expanded before the lateral pipe-lining material is inserted into the lateral pipe, or after the lateral pipe-lining material has been inserted into the lateral pipe, or when the curable resin is cured after insertion into the lateral pipe.

3. A lateral pipe-lining method according to claim 1; wherein the expandable flange-pressing implement is expanded by feeding the heat medium to the flange-pressing implement; and further comprising adjusting a pressing force produced by the expansion of the expandable flange-pressing implement by adjusting the rate at which the heat medium is fed to the expandable flange-pressing implement or by adjusting the rate at which the heat medium fed to the expandable flange-pressing implement is drained.

4. A lateral pipe-lining method according to claim 3; wherein the heat medium is used to cure the curable resin impregnated in the tubular resin-absorbing material.

5. A lateral pipe-lining method according to claim 4; wherein the flange is bonded to the periphery of the lateral pipe opening of the main pipe as a result of the expansion of the expandable flange-pressing implement.

6. A lateral pipe-lining method according to claim 3; further comprising circulating the supplied heat medium inside the expandable flange-pressing implement.

7. A lateral pipe-lining method according to claim 1; wherein the flange-pressing implement is expanded into a bag having a rectangular external shape.

8. A lateral pipe-lining method according to claim 1; wherein the expandable flange-pressing implement includes a helically wound tube.

9. A lateral pipe-lining method according to claim 1; wherein the heat medium is supplied by a heater arranged on the expandable flange-pressing implement.

10. A lateral pipe-lining method according to claim 1; wherein the flange of the lateral pipe-lining material is formed using a thermosetting resin.

11. A lateral pipe-lining method according to claim 1; wherein the flange of the lateral pipe-lining material is formed using a thermoplastic resin.

12. A lateral pipe-lining method according to claim 1; further comprising mounting the expandable flange-pressing implement on a head collar having a lower part covered by a cover sheet.

13. A lateral-pile lining method for lining a lateral pipe that intersects a main pipe, comprising:
providing a lateral pipe-lining material having a tubular resin-absorbing material impregnated with a curable resin and having a flange formed at one end of the tubular resin-absorbing material, an adhesive made of a thermosetting resin being applied onto the flange of the lateral pipe-lining material;
disposing the flange of the lateral pipe-lining material on an expandable flange-pressing implement; and
inserting the lateral pipe-lining material into the lateral pipe and curing the curable resin impregnated in the tubular resin-absorbing material to line the lateral pipe;
wherein a heat medium is supplied to the expandable flange-pressing implement so as to expand the flange-pressing implement to press the flange of the lateral pipe-lining material into contact with a periphery of a lateral pipe opening of the main pipe so that a gap is not formed between the flange and the periphery of the lateral pipe opening of the main pipe, the heat medium being supplied so as to gradually heat the flange of the lateral pipe-lining material and the adhesive applied thereon, after which the adhesive is cured to thereby bond the flange to the periphery of the lateral pipe opening of the main pipe.

14. A method according to claim 13; wherein the heat medium comprises hot water that is fed to the expandable flange-pressing implement, and the fed hot water cures the adhesive on the flange to secure the flange to the periphery of the lateral pipe opening of the main pipe.

15. A method according to claim 13; wherein the expandable flange-pressing implement is caused to expand before the lateral pipe-lining material has been inserted into the lateral pipe.

16. A method according to claim 13; wherein the expandable flange-pressing implement is caused to expand after the lateral pipe-lining material has been inserted into the lateral pipe.

17. A method according to claim 13; wherein the expandable flange-pressing implement is caused to expand when the curable resin impregnated in the tubular resin-absorbing material is cured after the lateral pipe-lining material has been inserted into the lateral pipe.

18. A method according to claim 13; wherein the expandable flange-pressing implement is disposed on a movable head collar; and further comprising, prior to causing the expandable flange-pressing implement to expand, moving the head collar to bring the flange of the lateral pipe-lining material to the periphery of the lateral pipe opening of the main pipe.

19. A method according to claim 13; wherein the expandable flange-pressing implement is caused to expand by feeding the heat medium to the expandable flange-pressing implement; and further comprising adjusting a pressing force produced by the expansion of the expandable flange-pressing implement by adjusting the rate at which the heat medium is fed to the expandable flange-pressing implement.

20. A method according to claim 13; wherein the expandable flange-pressing implement is caused to expand by feeding the heat medium to the expandable flange-pressing implement; and further comprising adjusting a pressing force produced by the expansion of the expandable flange-pressing implement by adjusting the rate at which the heat medium fed to the expandable flange-pressing implement is drained.

21. A lateral pipe-lining method according to claim 13; wherein the heat medium is supplied by a heater arranged on the expandable flange-pressing implement.

22. A lateral pipe-lining method according to claim 1; wherein the flange is made of a thermoplastic resin and is softened by the heat medium to thereby come into contact with the periphery of the lateral pipe opening of the main pipe.

23. A lateral pipe-lining method according to claim 13; wherein the flange is made of a thermoplastic resin and is softened by the heat medium to thereby come into contact with the periphery of the lateral pipe opening of the main pipe.

24. A lateral pipe-lining method according to claim 1; wherein the heat medium is supplied to the expandable flange-pressing implement at a temperature of about 60° C. to 90° C.

25. A lateral pipe-lining method according to claim 13; wherein the heat medium is supplied to the expandable flange-pressing implement at a temperature of about 60° C. to 90° C.

* * * * *